US011881351B2

(12) United States Patent
Dong et al.

(10) Patent No.: US 11,881,351 B2
(45) Date of Patent: Jan. 23, 2024

(54) PREPARATION METHOD OF RING-SHAPED SINTERED ND—FE—B MAGNET AND ITS MOULDING DIE

(71) Applicant: Yantai Shougang Magnetic Materials Inc, Yantai (CN)

(72) Inventors: Zhanji Dong, Yantai (CN); Zhongjie Peng, Yantai (CN)

(73) Assignee: Yantai Shougang Magnetic Materials Inc, Yantai (CN)

( * ) Notice: Subject to any disclaimer, the term of this patent is extended or adjusted under 35 U.S.C. 154(b) by 0 days.

(21) Appl. No.: 17/383,459

(22) Filed: Jul. 23, 2021

(65) Prior Publication Data

US 2022/0028590 A1 Jan. 27, 2022

(30) Foreign Application Priority Data

Jul. 26, 2020 (CN) ........................ 202010727125.X

(51) Int. Cl.
*H01F 41/02* (2006.01)
*H01F 1/057* (2006.01)
(Continued)

(52) U.S. Cl.
CPC ....... *H01F 41/0266* (2013.01); *H01F 1/0577* (2013.01); *H01F 1/0578* (2013.01); *H01F 3/08* (2013.01); *H01F 7/021* (2013.01)

(58) Field of Classification Search
CPC ........ H01F 1/0577; H01F 1/0578; H01F 3/08; H01F 7/021; C22C 2202/02; B22F 3/03; B22F 3/04; B22F 1/10; B22F 2998/10
See application file for complete search history.

(56) References Cited

U.S. PATENT DOCUMENTS 4,734,237 A * 3/1988 Fanelli ....................... B22F 3/22 419/36
7,776,255 B1 * 8/2010 Wedding ............... B22F 1/0655 419/36
(Continued)

FOREIGN PATENT DOCUMENTS

CN 101182603 A 5/2008
CN 203124733 U 8/2013
(Continued)

*Primary Examiner* — Sally A Merkling
*Assistant Examiner* — Nazmun Nahar Shams
(74) *Attorney, Agent, or Firm* — Gang Yu

(57) ABSTRACT

The disclosure provides a preparation method, which comprises:

providing a moulding die for a ring-shaped sintered Nd—Fe—B magnet;

placing a Nd—Fe—B magnetic powder into the mould cavity of the moulding die in a loosely packed state, the loosely packed height of the Nd—Fe—B magnetic powder is L;

placing a flexible cylindrical core into the loosely packed Nd—Fe—B magnetic powder at a L/2 position, wherein an axial direction of the flexible cylindrical core is horizontal and parallel to the direction of a magnetic field in the mould cavity;

applying a vertical pressure to the Nd—Fe—B magnetic powder to obtain a ring-shaped green block assembly with the flexible cylindrical core embedded;

after encapsulating and isolating the ring-shaped green block assembly, applying an isostatic pressure to the ring-shaped green block assembly;

sintering the ring-shaped green block assembly to obtain a ring-shaped sintered blank;

thermally aging, grinding and slicing the ring-shaped sintered blank.

5 Claims, 1 Drawing Sheet

(51) Int. Cl.
*H01F 3/08* (2006.01)
*H01F 7/02* (2006.01)

(56) References Cited

U.S. PATENT DOCUMENTS

| | | | | |
|---|---|---|---|---|
| 2010/0086429 | A1 | 4/2010 | Campbell et al. | |
| 2013/0343946 | A1 * | 12/2013 | Sagawa ................. | B22F 3/1021<br>419/36 |

FOREIGN PATENT DOCUMENTS

| | | | |
|---|---|---|---|
| CN | 111360268 | A | 7/2020 |
| CN | 111390163 | A | 7/2020 |

* cited by examiner

PREPARATION METHOD OF RING-SHAPED SINTERED ND—FE—B MAGNET AND ITS MOULDING DIE

BACKGROUND OF THE DISCLOSURE

1. Field of the Disclosure

The disclosure relates to a manufacturing process of sintered Nd—Fe—B magnets, in particular to a preparation method of a ring-shaped sintered Nd—Fe—B magnets and a moulding die used in the process.

2. Description of the Prior Art

Compared with traditional permanent magnet materials, sintered Nd—Fe—B permanent magnet materials are widely used worldwide due to their high magnetic energy product. The products involve wind power generation, compressors, acoustic and electrical components, new energy vehicles, and other fields.

According to the different conditions of use, the product shapes include square slices, tiles, cylinders, toroids, special-shaped, etc.

However, while sintered Nd—Fe—B is widely used, there are certain problems: the higher the complexity of the product shape, the higher the manufacturing cost of the sintered Nd—Fe—B magnet, such as the higher the machining costs.

Taking the ring-shaped sintered Nd—Fe—B magnet as an example, the current conventional production process is to mould a square green block under vertical or parallel magnetic field conditions and then perform sintering densification and annealing treatment to obtain a semi-finished product.

In the subsequent machining process, the outer circumference of the part is first cut to form the outer diameter of the circular product, and then the inner loop is cut, ground, or hollowed (drilled) to form the circular product.

On the whole, in the process of finished product processing, processing the outer diameter and inner diameter not only increases the cumbersome degree of the machining process, but also brings huge material waste, and the comprehensive material utilization rate of the product is even less than 60%.

Even by improving the processing technology, it is difficult to fundamentally increase the material utilization rate. For example, the production method of the ring magnet disclosed in the patent number CN101728041B uses an improved processing procedure to process the sintered block to the toroidal block. Although it saves the cost in terms of processing, the material loss of the inner arc cannot be avoided.

An improved production method that is also relatively easy to implement is as follows: In the green block manufacturing stage, semicircular upper and lower indenters are used to directly produce cylindrical green bodies. After isostatic pressing, the mould core is removed before sintering. Semi-finished cylindrical blank are obtained by sintering and aging process.

In the subsequent machining process, the outer circumference of the part is not required to be cut, and only a small amount of grinding is required to obtain the outer diameter of the annular product. Afterward, a similar processing method as described above is carried out to form the inner diameter of the circular product.

This production process reduces the material waste of the outer contour and significantly improves the material utilization rate. Under the same product size condition, the material utilization rate can be increased to 60 to 70%, but due to the material loss of the inner arc, the utilization rate is still low.

Further improved production methods have been developed, such as the technology published in patent number CN203124733U and the production method of ring magnets published in patent number CN102528029A. In the green block manufacturing stage, a mould capable of directly producing ring-shaped Nd—Fe—B magnets is set, using a semicircle shaped upper and lower indenters equipped with cylindrical mould cores. After moulding, a circular ring-shaped green block is formed. The sintered magnet block does not need a large amount of inner hole cutting processing, which can improve production efficiency and material utilization.

However, there are problems such as difficult ejection of the mould core from the mould, damage to the integrity of the inner surface of the annular green block, and time-consuming man-hours. In addition, since the inner hole of the green block is not easy to be heated, it is easy to cause poor ring-shaped sintering shrinkage and cracking of the magnet.

Another production method has been disclosed in patent number CN204584268U, which uses an isostatic structure suitable for ring-shaped Nd—Fe—B magnets, using rubber, nylon, plastic, or metal as the core. In addition, a diaphragm structure is added between the mould core and the inner hole of the green block, so that the process of removing the mould core from the green block after isostatic pressing is easier without damaging the surface of the inner hole of the green block.

However, as mentioned above, the use of this technique requires the core to be removed before sintering, so there are also the problems of time-consuming procedure, the inner hole of the green block is not easy to be heated, and it is easy to cause poor ring-shaped sintering shrinkage and cracking of the magnet.

CN204686013U teaches an improved ring-shaped Nd—Fe—B sintered boat. The inside of the sintered boat has quartz sand or corundum material. The sintered boat is an integrated structure of the main block and the cylindrical core in the middle, and the diameter of the core is smaller than the inner diameter of the sintered magnet.

This technology improves the sintering and heating method of the toroidal magnet, and at the same time reduces the proportion of magnet cracking when the green block is sintered and shrinks.

However, it is inevitable that the inner core of the green block needs to be removed in advance before the green block is placed in the sintering boat. Therefore, there is also the possibility of consuming man-hours and destroying the green block.

There is still need for improving the preparation of ring-shaped sintered Nd—Fe—B magnets, specifically with respect to high material utilization rate, easy processing, and less sintering cracking.

The ring-shaped sintered Nd—Fe—B magnet is widely used in the market, and its magnetic properties and sizes are different. However, these products have one thing in common. They cannot avoid the process of machining the inner hole separately in the machining process from the blank to the finished product.

After the inner hole material is processed, it can only be recycled as waste, which leads to the low material utilization rate of the circular product.

Moreover, the greater the proportion of the annular diameter of the inner hole, the more serious the material waste.

Although the currently known technology introduces the process of directly producing circular blanks, which can improve material utilization, the production of circular blanks is very difficult. One of the manifestations is that the blanks are prone to sintering and cracking.

The reason is that the external heating is rapid during sintering, and the internal heating is slow, and the sintering shrinkage rate of the inner and outer parts of the green block is inconsistent, leading to cracking.

In view of this, the present disclosure adopts the following technical solutions to solve the above-mentioned main problems.

SUMMARY OF THE DISCLOSURE

The disclosure is defined by the appended claims. The description that follows is subjected to this limitation. Any disclosure lying outside the scope of said claims is only intended for illustrative as well as comparative purposes.

According to one aspect of the present disclosure, there is provided a method for preparing a ring-shaped sintered Nd—Fe—B magnet, which comprises the following steps:

step a) providing a moulding die for a ring-shaped sintered Nd—Fe—B magnet including a main block, an upper indenter, a lower indenter, and a mould cavity, the main block including two opposite non-magnetically conductive side plates and two opposite magnetic side plates;

in the space formed between the two non-magnetic side plates and the two magnetic side plates, there is provided the lower indenter and the upper indenter, wherein the lower indenter is at the bottom of the space, the upper indenter is at the top of the space, and the mould cavity is located between the upper and lower indenters;

step b) placing a Nd—Fe—B magnetic powder into the mould cavity of the moulding die in a loosely packed state, the loosely packed height of the Nd—Fe—B magnetic powder is L;

step c) placing a flexible cylindrical core into the loosely packed Nd—Fe—B magnetic powder at a L/2 position, wherein an axial direction of the flexible cylindrical core is horizontal and parallel to the direction of a magnetic field in the mould cavity;

step d) applying a vertical pressure to the Nd—Fe—B magnetic powder to obtain a ring-shaped green block assembly with the flexible cylindrical core embedded therein;

step e) after encapsulating and isolating the ring-shaped green block assembly, applying an isostatic pressure to the ring-shaped green block assembly;

step f) sintering the ring-shaped green block assembly to obtain a ring-shaped sintered blank; and step g) thermally aging, grinding and slicing the ring-shaped sintered blank to obtain the ring-shaped sintered Nd—Fe—B magnet.

The flexible cylindrical core may be formed from powders of alumina and/or zirconia, which are bonded with an organic adhesive. A weight content of the powders of alumina and/or zirconia in the flexible cylindrical core may be 50 wt. %-90 wt. % of the total weight of the flexible cylindrical core. The organic adhesive may be a polyethylene glycol. The flexible cylindrical core may have a diameter of 2 mm<R<5 mm. A length W which is equal to the mould cavity width.

Another aspect of the present disclosure refers to the use of the above-mentioned flexible cylindrical core formed from powders of alumina and/or zirconia, which are bonded with an organic adhesive, for preparing a ring-shaped sintered Nd—Fe—B magnet.

Another aspect of the present disclosure refers to a moulding die for a ring-shaped sintered Nd—Fe—B magnet including a main block, an upper indenter, a lower indenter, and a mould cavity. The main block includes two opposite non-magnetically conductive side plates and two opposite magnetic side plates. In the space formed between the two non-magnetic side plates and the two magnetic side plates, there is provided the lower indenter and the upper indenter, wherein the lower indenter is at the bottom of the space, the upper indenter is at the top of the space, and the mould cavity is located between the upper and lower indenters. A Nd—Fe—B magnetic powder is placed into the mould cavity of the moulding die in a loosely packed state, the loosely packed height of the Nd—Fe—B magnetic powder is L. A flexible cylindrical core is placed into the loosely packed Nd—Fe—B magnetic powder at a L/2 position, wherein an axial direction of the flexible cylindrical core is horizontal and parallel to the direction of a magnetic field in the mould cavity.

Further aspects of the present disclosure are as follows:

A moulding die for a ring-shaped sintered Nd—Fe—B magnet is provided, which is special in that:

It includes an upper indenter, a lower indenter, and a mould cavity on the main block.

The main block includes two opposite non-magnetically conductive side plates and two opposite magnetically conductive side plates.

In the space formed between the two non-magnetically conductive side plates and the two magnetically conductive side plates, there is a lower indenter and an upper indenter.

The lower indenter is at the bottom of the space, the upper indenter is at the top of the space, and the cavity is located between the upper and lower indenters.

The flexible cylindrical core is placed in the mould cavity.

Preferably, after the loosely packed Nd—Fe—B magnetic powder is located into the mould cavity, the flexible cylindrical core is placed in the mould cavity, and the axial direction of the flexible cylindrical core is horizontal, and between the two magnetic side plates, the direction of the magnetic field is parallelized.

Preferably, the length W of the flexible cylindrical core is consistent with the distance between the inner walls of the two magnetically conductive side plates.

The diameter R of the flexible cylindrical core is less than half the distance between the two non-magnetically conductive side plates.

Preferably, the value of the diameter R of the flexible cylindrical core is 2 mm<R<5 mm.

Preferably, the lower indenter is fixed or movably connected at the bottom of the space formed between the two non-magnetically conductive side plates and the two magnetically conductive side plates.

When the lower indenter is movably connected, the lower indenter moves back and forth in the space, and the upper indenter is movably connected to the top of the space between the two non-magnetically conductive side plates. And the two magnetically conductive side plates and the upper-pressure head moves back and forth in the space.

A method for preparing a ring-shaped sintered Nd—Fe—B magnet may include the preparation steps:

a. Material preparation: prepare a flexible cylindrical core with a diameter of R and a length of W; according to the required weight of the Nd—Fe—B block, prepare the same weight of sintered Nd—Fe—B magnetic powder;

b: Material placement: Put the Nd—Fe—B magnetic powder into the forming mould in a loosely packed state. The loose-packed height of the Nd—Fe—B magnetic powder is L; put the flexible cylindrical core into the loosely packed magnetic powder, and it is at the position L/2 of the loose mounting height, the axial direction of the flexible cylindrical core 4 is horizontal and parallel to the direction of the magnetic field;

c. Green block production: vertical pressure is applied to the Nd—Fe—B magnetic powder with a flexible cylindrical core in the forming mould to obtain an annular green composite block with a flexible cylindrical core embedded therein;

d. Isostatic pressing treatment: After encapsulating and isolating the annular green block assembly, it is placed in liquid isostatic pressing, and isostatic pressure is applied to obtain the annular green block assembly with higher density;

e. Sintering and aging treatment: Put the ring-shaped green block assembly into a sintering furnace for vacuum sintering to obtain a ring-shaped sintered blank. At the same time, the flexible cylindrical core is dispersed under the action of high temperature and separated from the ring-shaped sintered blank; The ring-shaped sintered blank after sintering is placed in an aging furnace for aging, and an aged ring-shaped blank is obtained; and f. The ring-shaped blanks are respectively subjected to external arc and internal arc grinding, as well as end surface flat grinding, and subsequent slicing, to obtain machined semi-finished products; surface treatment of the machined semi-finished products to obtain ring-shaped Nd—Fe—B Finished product.

The main material of the flexible cylindrical core is alumina or zirconia powder, or a mixture of the two, and is made by glue bonding.

The preparation process of the flexible cylindrical core mainly includes mixing polyethylene glycol powder and purified water according to the proportion of parts.

The proportion of polyethylene glycol powder is preferably 70 to 90%, and the water is mixed with polyethylene glycol. Boiling into polyethylene glycol glue, the boiling process can use glass or stainless steel cups, the lower part is heated by an electric furnace or alcohol furnace, and the heating process is constantly stirred; the polyethylene glycol glue is mixed with alumina or zirconia powder according to the ratio.

The preferred ratio is that the weight ratio of aluminum oxide or zirconium oxide is between 50%-90%, prepared in a semi-solid state.

The semi-solid mixture is placed in a cylindrical mould of rubber material, vacuum-encapsulated, and then isostatically pressed; the isostatically pressed moulded block is dried at a temperature of 80 to 150° C. for 2 to 10 hours to increase the hardness and remove the moisture. The final flexible cylindrical core is obtained.

The diameter R of the flexible cylindrical core is preferably set between 2 mm and 5 mm. If R is too small, for example, R is less than 2 mm, the core will be more difficult to be produced and easy to break. If R is too large, for example, R is greater than 5 mm, during moulding, the core itself will shrink too much under pressure, which will cause serious deformation of the green block and low pass rate.

Compared with the prior art, the present disclosure has the following advantages:

The flexible cylindrical core of the forming mould used in the preparation process of the present application is equivalent to replacing the inner arc part of the toroidal magnet, which not only saves materials but also does not require re-drilling or hollowing out during subsequent processing.

The strength of the flexible cylindrical core is much lower than that of the compacted Nd—Fe—B green block. It is relatively soft and has a relatively low density.

The flexible cylindrical core plays a role in reducing the occurrence rate of cracks. During sintering, heat will be transferred to the inside of the Nd—Fe—B green block through the core, so that the inner arc surface of the Nd—Fe—B green block also heats up at the same time, reducing the temperature difference between the inner arc surface and the outer arc surface, and then reduces the difference in shrinkage, at last, it is not easy to cause cracks.

At the same time, because the flexible cylindrical core is a bonded hybrid structure, and its strength is lower than that of the sintered green block, under the dual effects of its own heating and the shrinkage of the green block wrapped around it, polyethylene glycol begins to decompose at high temperature. The lubricant and other organic substances inside the blank are degassed and discharged together, and at the same time the flexible cylindrical core starts to soften and shrink, and there is no need to take out the flexible cylindrical core.

The ring-shaped Nd—Fe—B magnet produced by the flexible cylindrical core of the present disclosure is obviously improved in the qualification rate of sintered products and the utilization rate of the Nd—Fe—B magnetic powder material.

DETAILED DESCRIPTION OF THE DISCLOSURE

Figure 1:
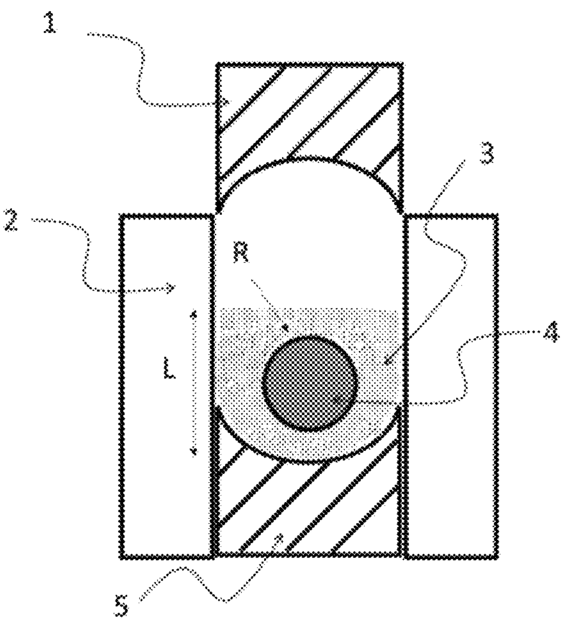
FIG. 1 is a first schematic cross-sectional view on a moulding device during the inventive preparation process.
Figure 2:
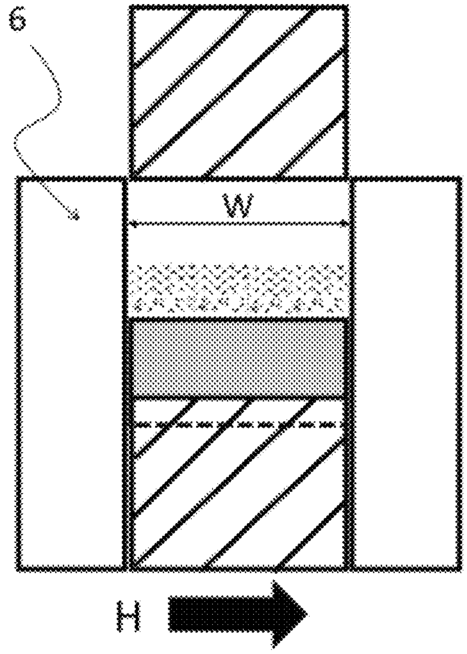
FIG. 2 is a second schematic cross-sectional view on the moulding device during the inventive preparation process.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

A Nd—Fe—B magnet (also known as NIB or Neo magnet) is the most widely used type of rare-earth magnet. It is a permanent magnet made from an alloy of neodymium, iron, and boron to form the $Nd_2Fe_{14}B$ tetragonal crystalline structure as a main phase. Besides, the microstructure of Nd—Fe—B magnets includes usually a Nd-rich phase. The alloy may include further elements in addition to or partly substituting neodymium and iron, which is however not important for the present disclosure far as the microstructure includes the main phase and the Nd-rich phase. In other words, a Nd—Fe—B magnet at presently understood covers all such alloy compositions. Because of different manufacturing processes, Nd—Fe—B magnets are divided into two subcategories, namely sintered Nd—Fe—B magnets and bonded Nd—Fe—B magnets. Conventional manufacturing processes for both subcategories usually include the sub-step of preparing Nd—Fe—B powders from Nd—Fe—B alloy flakes obtained by a strip casting process. The presently presented process refers to sintered Nd—Fe—B magnets.

The composition of the Nd—Fe—B powder may refer to the commercially available general-purpose sintered Nd—Fe—B grades. For example, its basic composition can be set to $Re_aT(1\text{-}abc)B_bM_c$, where RE is a rare earth element selected from at least one of Pr, Nd, Dy, Tb, Ho, and Gd, T is at least one of Fe or Co, B is element B, M is at least one of Al, Cu, Ga, Ti, Zr, Nb, Mo, and V, and a, b, and c may be 27 wt. %≤a≤wt.33%, 0.85 wt. %≤b≤1.3 wt. %, and c≤5 wt. %.

Commercially available or freshly produced alloy powders could be used for the inventive process of preparing ring-shaped sintered Nd—Fe—B magnets. Specifically, Nd—Fe—B alloy flakes may be produced by a strip casting process, then subjected to a hydrogen embrittlement process and jet milling for preparing the desired Nd—Fe—B magnet powders. The strip casting process, the hydrogen embrittlement process, and the jet milling process are currently well-known technologies.

For forming a sintered Nd—Fe—B magnet, the powder is generally moulded at first time in a moulding die under pressure and parallel magnetic field conditions, and the moulded block is moulded for a second time under liquid isostatic pressing conditions, followed by vacuum sintering in a vacuum sintering furnace for densification. Afterwards, heat aging treatment is performed in a heat treatment furnace to obtain a blank.

The preparation method of a ring-shaped sintered Nd—Fe—B magnet further includes—after obtaining the sintered block—processing different steps of grinding and slicing using conventional machine equipment.

The moulding die for the ring-shaped (or annular) sintered Nd—Fe—B magnet of the present disclosure comprises a flexible cylindrical core. The flexible cylindrical core may be formed of a commercially available powder material, specifically alumina powder, zirconia powder or mixtures thereof. An average particle size (D50) of the powder material is preferably in the range of 0.5 to 2 mm. Further, the cylindrical core includes an organic adhesive as plasticiser and binder. Organic adhesives acting as plasticiser and binder for ceramic moulding compounds are well-known in the art. The organic adhesive preferably has sufficient strength to stabilise the core up to a temperature of at least 100° C., which will simplify the production process and handling of the core. Preferably, a thermally induced decomposition of the organic adhesive should start at a temperature of 150° C. to 350° C. The organic adhesive for adhering the powder material may be a commercially available adhesive. Specifically, the organic adhesive may be a polyethylene glycol, such as PEG-600. The organic adhesive is preferably added to the above-mentioned powder material in form of particles, such as PEG particles.

The reason why in particular polyethylene glycol may be used in the production of the flexible cylindrical core is that polyethylene glycol is a highly viscous, water-soluble organic material, and its viscosity can be used to prepare a high-viscosity glue. After forming a semi-solid mixture with the powder, the bonding is firm, the moisture content is low, and the deformation during drying is also small.

A weight content of alumina, zirconia or mixtures thereof in the flexible cylindrical core is preferably between 50 wt. %-90 wt. % of the total weight of the flexible cylindrical core. The remaining content is preferably the organic adhesive. Impurities and additives should preferably be less than 1 wt. %. When the content is less than 50 wt. %, the fluidity of the mixture for forming the flexible cylindrical core is too high and accurate forming and stability of the flexible cylindrical core may deteriorate. Further, decomposition of the core during the sintering of the magnet may be too fast resulting in an increased crack rate. When the content is higher than 90 wt. %, the bonding is not strong enough and easy to loosen.

During moulding, the flexible cylindrical core is placed in the Nd—Fe—B powder in a horizontal direction, and the depth of the insertion is at half of the loose height of the powder.

The magnetic field in the mould cavity during moulding is horizontal. When the flexible cylindrical core is embedded in the green block under the pressure of the forming press, the position of the core is at the center of the green block.

When the green block shrinks during the sintering process, its radial proportion decreases, but the arc shape remains basically unchanged.

The method where the cylindrical core is at one-half of the loose mounting height can be optimized by the following steps. For example, the powder feeding process is divided into two equal weight proportions. After the powder is given for the first time, the core is placed into the powder, and then the second part of the powder is added.

Alternatively, an auxiliary positioning plate can be used to first put the core and positioning plate into the cavity, and then add all the powder into the cavity. When the powder is loosely packed, the positioning plate will be pulled out from the mould cavity.

The flexible cylindrical core will play a role in reducing the incidence of cracks: due to the sintering, the core is inside the Nd—Fe—B green block and enters the furnace together with the sintered green block.

During a low-temperature stage of vacuum heating and sintering (for example, 400° C. or below) at the beginning of the sintering process step, heat will be transferred to the inside of the Nd—Fe—B green block through the core, so that the inner arc surface of the Nd—Fe—B green block also heats up at the same time, reducing the temperature difference between the inner arc surface and the outer arc surface, thereby reducing the difference in shrinkage and, as a consequence, avoiding cracks.

At the same time, because the flexible cylindrical core is a bonded hybrid structure, and its strength is lower than that of the sintered green block, the organic adhesive, in particular polyethylene glycol, begins to decompose when the temperature further rises.

Under the dual effects of its own heating and the shrinkage of the green block wrapped around it, the organic material (such as polyethylene glycol) inside the green block is degassed and discharged, and the flexible cylindrical core begins to soften and shrink.

Since the sintering of Nd—Fe—B at low temperature is mainly liquid phase sintering, and the porosity is large, the shrinkage rate of the green block is relatively large, but the softening and shrinking process of the flexible cylindrical core coincides with the liquid phase sintering stage, which can be reduced to a certain extent. The shrinkage of the fit inner ring can continuously transfer heat, make the inside and outside of the green block heat evenly, and reduce the proportion of sintering cracks.

When the temperature continues to rise (for example, between 400° C. and 800° C.), the polyethylene glycol of the flexible cylindrical core has gradually completely decomposed and volatilized completely, and the flexible cylindrical core completely loses its support and collapses into powder.

Most of the shrinkage process of the toroidal magnet has also been completed. In the second stage of liquid phase sintering, the shrinkage rate is reduced, the density increase rate is reduced, and sintering cracks will no longer occur.

The moulding die for an annular sintered Nd—Fe—B magnet will be set into a moulding device. Pressing equipment of the moulding device may include, for example, a hydraulic press. A magnetic field power supply will apply a magnetic field during the pressing, specifically a magnetic field of 1.5 to 2.0 Tesla. The pressing direction is up and down pressing and the magnetic field direction is set to a horizontal direction.

In order to illustrate the beneficial effects of the present disclosure in improving the qualification rate of sintered products, a quality factor rate is calculated by using the ratio of the number of crack-free annular blanks after sintering and the number of forming green blanks into the furnace.

In order to facilitate the description of the beneficial effects of the present disclosure in improving the material utilization rate, the weight ratio of the product processed by the internal grinder to the powder feed weight ratio before forming is used to calculate the material utilization rate.

Example 1

40 g of alumina powder and 20 g of a polyethylene glycol (PEG-600, colloidal solution) are mix evenly and placed in a cylinder. In a rubber mould, isostatic pressure moulding is performed at 200 MPa and the pressed blank is dried at 120° C. for 2 h to prepare a flexible cylindrical core.

The diameter R1 of the flexible cylindrical core is 4 mm, and the length W1 is 50 mm.

In the loosely packed state, 86 g of Nd—Fe—B powder is filled into the moulding die, and the loose packed height L1 of the poured powder is 30 mm.

The flexible cylindrical core is embedded into the powder in a horizontal manner so that the height direction position is at L1/2, i.e. 15 mm.

The indenter of the moulding die is closed and under a magnetic field of 1.5 Tesla the powder and the core are integrally formed. After demoulding, an annular green block assembly is obtained.

After encapsulating the annular green block assembly, the density is increase by applying 200 MPa by water isostatic pressure.

The green block assembly is sintered and densified in a vacuum furnace at a sintering temperature of 1030° C. and a sintering time of 10 hours to obtain a round ring sintered blank.

Aging treatment of the blank in an aging furnace is performed to obtain a semi-finished product.

The end face, outer arc surface, and inner arc surface of the semi-finished product is grinded blank on a surface grinder and the grinding depth is 0.5 mm.

The semi-finished blank is sliced along its axial direction on an inner circular slicer to obtain a circular ring machine processed product, i.e. a ring-shaped sintered Nd—Fe—B magnet.

Example 2

40 g of alumina powder and 36 g of a polyethylene glycol (PEG-600, colloidal solution) are mix evenly and placed in a cylinder. In a rubber mould, isostatic pressure moulding is performed at 200 MPa and the pressed blank is dried at 120° C. for 2 h to prepare a flexible cylindrical core.

The diameter R1 of the flexible cylindrical core is 5 mm, and the length W1 is 50 mm.

In the loosely packed state, 86 g of Nd—Fe—B powder is filled into the moulding die, and the loose packed height L1 of the poured powder is 31 mm.

The flexible cylindrical core is embedded into the powder in a horizontal manner so that the height direction position is at L1/2, i.e. 15,5 mm.

The indenter of the moulding die is closed and under a magnetic field of 1.5 Tesla the powder and the core are integrally formed. After demoulding, an annular green block assembly is obtained.

After encapsulating the annular green block assembly, the density is increase by applying 200 MPa by water isostatic pressure.

The green block assembly is sintered and densified in a vacuum furnace at a sintering temperature of 1030° C. and a sintering time of 10 hours to obtain a round ring sintered blank.

Aging treatment of the blank in an aging furnace is performed to obtain a semi-finished product.

The end face, outer arc surface, and inner arc surface of the semi-finished product is grinded blank on a surface grinder and the grinding depth is 0.5 mm.

The semi-finished blank is sliced along its axial direction on an inner circular slicer to obtain a circular ring machine processed product, i.e. a ring-shaped sintered Nd—Fe—B magnet.

Comparative Example 1

A cylindrical core made of stainless steel is prepared. The diameter R1 of the cylindrical core is 5 mm and the length W1 is 50 mm.

The radius R1 of the flexible cylindrical core is 4 mm, and the length W1 is 50 mm.

In the loosely packed state, 86 g of Nd—Fe—B powder is filled into the moulding die, and the loose packed height L1 of the poured powder is 30 mm.

The flexible cylindrical core is embedded into the powder in a horizontal manner so that the height direction position is at L1/2, i.e. 15 mm.

The indenter of the moulding die is closed and under a magnetic field of 1.5 Tesla the powder and the core are integrally formed. After demoulding, an annular green block assembly is obtained.

After encapsulating the annular green block assembly, the density is increase by applying 200 MPa by water isostatic pressure and then the stainless steel core is taken out.

The green block assembly is sintered and densified in a vacuum furnace at a sintering temperature of 1030° C. and a sintering time of 10 hours to obtain a round ring sintered blank.

Aging treatment of the blank in an aging furnace is performed to obtain a semi-finished product.

The end face, outer arc surface, and inner arc surface of the semi-finished product is grinded blank on a surface grinder and the grinding depth is 0.5 mm.

The semi-finished blank is sliced along its axial direction on an inner circular slicer to obtain a circular ring machine processed product, i.e. a ring-shaped sintered Nd—Fe—B magnet.

During the continuous production of multiple annular sintered blanks, it was found that in the process of removing the stainless steel core, it is easy to cause the inner wall of the annular green blank to fall off, resulting in a material drop off from the inside surface of the annular sintered blank after sintering.

Comparative Example 2

45 g of alumina powder and 60 g of polyethylene glycol (PEG-600, colloidal solution) are mix and stir evenly, in a cylindrical rubber mould, isostatically pressed at 200 Mpa, and dried for 2 h at 120° C.

A diameter R1 of the flexible cylindrical core is 6 mm and the length W1 is 50 mm. The diameter of the flexible cylindrical core in this comparative example is larger than this application.

In the loosely packed state, pour 86 g of powder is filled into the forming mould and the loose packed height of the poured powder is L1=35 mm.

The flexible cylindrical core is embedded into the powder in a horizontal manner so that the height direction position is at L1/2.

The indenter of the moulding die is closed and under a magnetic field of 1.5 Tesla the powder and the core are integrally formed. After demoulding, an annular green block assembly is obtained.

After encapsulating the annular green block assembly, the density is increase by applying 200 MPa by water isostatic pressure.

The green block assembly is sintered and densified in a vacuum furnace at a sintering temperature of 1030° C. and a sintering time of 10 hours to obtain a round ring sintered blank.

The subsequent machining process is the same as in Example 1.

Comparative Example 3

In the loosely packed state, pour 118 g of Nd—Fe—B powder is added into the forming mould, but no core is used inside the mould during moulding.

The indenter is closed and the powder is moulded under the condition of a magnetic field of 1.5 Tesla. After demoulding, a cylindrical green block is obtained.

After packaging the cylindrical green block, the density is increased under 200 Mpa water isostatic pressure.

The green block is sintered and densified in a vacuum furnace at a sintering temperature of 1030° C. and a sintering time of 10 hours to obtain a cylindrical sintered blank.

Grinding the end face and the outer arc surface of the sintered blank on a surface grinder is done with a grinding volume of 0.5 mm.

The inner round hole is processed with a drilling knife on the blank after the outer arc surface is exposed to shine.

The subsequent machining process is the same as in Example 1.

In the production process of Comparative Example 3, drilling the round hole takes a long time and at the same time, there is a lot of material waste.

Comparative Example 4

In the loosely packed state, pour 86 g of Nd—Fe—B powder is filled into the forming mould with a loose packed height of L1=35 mm.

A cylindrical core made of aluminum with a diameter of 5 mm is set into the loose powder horizontally so that the aluminum core is at L1/2.

The indenter is closed and the powder is moulded under the condition of a magnetic field of 1.5 Tesla. After demoulding, a cylindrical green block is obtained.

After packaging the cylindrical green block, the density is increased under 200 Mpa water isostatic pressure.

The green block is sintered and densified in a vacuum furnace at a sintering temperature of 1030° C. and a sintering time of 10 hours to obtain a cylindrical sintered blank.

After the end of the sintering step, it is observed that because of the presence of aluminum inside the sintered blank at this time, during the sintering process, the aluminum melts and fuses with the inner arc surface of the sintered blank. The appearance and structure of the magnet are severely damaged and cannot be put into subsequent production. Therefore, the material utilization rate cannot be determined.

Comparative Example 5

In the loosely packed state, pour 86 g of Nd—Fe—B powder is filled into the forming mould with a loose packed height of L1=35 mm.

A cylindrical core made of ceramic material with a diameter of 5 mm is set into the loose powder horizontally so that the aluminum core is at L1/2.

The indenter is closed and the powder is moulded under the condition of a magnetic field of 1.5 Tesla. After demoulding, a cylindrical green block is obtained, which contains a ceramic core.

After packaging the cylindrical green block, the density is increased under 200 Mpa water isostatic pressure.

The green block containing the ceramic core is sintered and densified in a vacuum furnace at a sintering temperature of 1030° C. and a sintering time of 10 hours to obtain a cylindrical sintered blank.

After the sintering step, the appearance of the blank was observed, and it was found that because of the high hardness inside, the ceramic core that could not shrink with the green block caused the green block to be completely cracked after sintering and could not be put into subsequent production. No statistics on material utilization rate could be determined.

In Table 1, the blank qualification rate and material utilization rate of each example and comparative example is summarized.

TABLE 1

Statistic table of blank qualification rate and material utilization rate

| category | core | Powder weight (g) | Weight after internal grinding (g) | Material utilization | Qualified rate of sintering blocks |
|---|---|---|---|---|---|
| Example 1 | Soft core with R = 4 mm | 86 | 73 | 85% | 98% |
| Example 2 | Soft core with R = 5 mm | 86 | 70 | 81% | 96% |

TABLE 1-continued

Statistic table of blank qualification rate and material utilization rate

| category | core | Powder weight (g) | Weight after internal grinding (g) | Material utilization | Qualified rate of sintering blocks |
|---|---|---|---|---|---|
| Comparative example 2 | stainless steel | 86 | 66 | 77% | 50% |
| Comparative example 2 | Soft core with R = 6 mm | 86 | 71 | 83% | 70% |
| Comparative example 3 | No core | 118 | 71 | 60% | 99% |
| Comparative example 4 | Aluminum core-do not take out | 86 | With out maching | — | 0% |
| Comparative example 5 | Ceramic-do not take out | 86 | With out maching | — | 0% |

Analysis of the Results:

It can be seen from the comparison that the qualified rate as well as the material utilization rate of Examples 1 and 2 is high.

Comparative Example 3 did not use any form of core, and the weight was significantly higher when feeding powder, but the material utilization rate was not high. Although the pass rate was high, it was because all magnetic powder was used.

Therefore, the annular Nd—Fe—B magnet produced by the process method and device of the present disclosure can significantly improve the material utilization rate and the blank sintering pass rate.

What is claimed is:

1. A method for preparing a ring-shaped sintered Nd—Fe—B magnet, comprising the following steps:

step a) providing a moulding die for a ring-shaped sintered Nd—Fe—B magnet including a main block, an upper indenter, a lower indenter, and a mould cavity, the main block including two opposite non-magnetically conductive side plates and two opposite magnetic side plates;

in the space formed between the two non-magnetic side plates and the two magnetic side plates, there is provided the lower indenter and the upper indenter, wherein the lower indenter is at the bottom of the space, the upper indenter is at the top of the space, and the mould cavity is located between the upper and lower indenters;

step b) placing a Nd—Fe—B magnetic powder into the mould cavity of the moulding die in a loosely packed state, the loosely packed height of the Nd—Fe—B magnetic powder is L;

step c) placing a flexible cylindrical core into the loosely packed Nd—Fe—B magnetic powder at a L/2 position, wherein an axial direction of the flexible cylindrical core is horizontal and parallel to the direction of a magnetic field in the mould cavity;

step d) applying a vertical pressure to the Nd—Fe—B magnetic powder to obtain a ring-shaped green block assembly with the flexible cylindrical core embedded therein;

step e) after encapsulating and isolating the ring-shaped green block assembly, applying an isostatic pressure to the ring-shaped green block assembly;

step f) sintering the ring-shaped green block assembly to obtain a ring-shaped sintered blank; and step g) thermally aging, grinding and slicing the ring-shaped sintered blank to obtain the ring-shaped sintered Nd—Fe—B magnet; the flexible cylindrical core is formed from powders of alumina and/or zirconia, which are bonded with an organic adhesive, and the strength of the flexible cylindrical core is lower than that of the sintered green block; and in the sintering step, the flexible cylindrical core can soften and shrink.

2. The preparation method according to claim 1, wherein a weight content of the powders of alumina and/or zirconia in the flexible cylindrical core is 50 wt. %-90 wt. % of the total weight of the flexible cylindrical core.

3. The preparation method according to claim 2, wherein the organic adhesive is a polyethylene glycol.

4. The preparation method according to claim 1, wherein the flexible cylindrical core has a diameter of 2 mm<R<5 mm and a length W which is equal to the mould cavity width.

5. The preparation method according to claim 2, wherein the organic adhesive is a polyethylene glycol.

* * * * *